United States Patent
Anderson et al.

(10) Patent No.: US 9,323,934 B2
(45) Date of Patent: Apr. 26, 2016

(54) MANAGING AND TRACKING COMMANDS ASSOCIATED WITH A CHANGE ON A COMPUTER SYSTEM

(71) Applicant: International Business Machines Corporation, Armonk, NY (US)

(72) Inventors: Eric Anderson, Friendswood, TX (US); Christopher J. Dawson, Arlington, VA (US); Leslie A. Nelson, Benson, NC (US); Brett W. Singletary, Clayton, NC (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 13/628,775

(22) Filed: Sep. 27, 2012

(65) Prior Publication Data

US 2014/0089483 A1    Mar. 27, 2014

(51) Int. Cl.
*G06F 15/173*    (2006.01)
*G06F 21/57*    (2013.01)
*G06F 21/55*    (2013.01)

(52) U.S. Cl.
CPC .............. *G06F 21/577* (2013.01); *G06F 21/55* (2013.01); *G06F 2221/2141* (2013.01)

(58) Field of Classification Search
CPC ...... G05B 15/02; G05B 19/0428; G05B 1/01; G05B 2219/24041; G05B 2219/31467; G05B 2219/36159; G05B 23/0267; H04L 41/082; H04L 12/1822; H04L 12/2803; H04L 12/2812; H04L 12/2838; H04L 12/66; H04L 29/06047; H04L 41/0869; H04L 41/0883; H04L 45/02; H04L 45/48; H04L 63/0823; H04L 63/1433; H04L 63/168; H04L 63/20; H04L 65/403; H04L 67/02; H04L 67/06; H04L 65/00; H04L 65/1093; H04L 12/2425; H04L 41/0803; H04L 41/0806; H04L 41/0853; H04L 63/101; H04L 12/24; H04L 41/00; H04L 41/0253; H04L 41/046; H04L 41/0893; H04L 41/12; H04L 63/08; H04L 63/10; H04L 63/18; H04L 67/025; H04L 67/34; H04L 69/14; H04L 41/0843; H04L 43/01; H04L 45/42; H04L 29/12264; H04L 41/0206; H04L 41/0266; H04L 41/0816; H04L 41/0873; H04L 43/0817; H04L 45/28; H04L 45/304; H04L 45/3065; H04L 61/2015; H04L 63/083; H04L 63/102; H04L 61/2046; H04L 63/02; H04L 41/0654; H04L 63/105; H04L 63/1408; G06Q 10/06; H04W 4/22; H04W 76/007; H04W 88/18; H04W 4/001; H04W 48/02; H04W 24/02; H04W 4/00; G06F 3/067; G06F 17/30589; G06F 2221/2141; G06F 3/0629
USPC .................................. 709/223, 221; 713/100
See application file for complete search history.

(56) References Cited

U.S. PATENT DOCUMENTS 5,263,165 A * 11/1993 Janis ....................... G06F 9/468
                                                          711/163

(Continued)

OTHER PUBLICATIONS

Quest Software Inc., "Developer and Administrator Access to Production" [online]. Copyright 2011 Quest Software Inc., [retrieved on May 10, 2012]. Retrieved from the internet<URL: http://www.webcitation.org/67U3FkE1z>.

*Primary Examiner* — Kevin Bates
*Assistant Examiner* — Ranjan Pant
(74) *Attorney, Agent, or Firm* — Edward P. Li; John Pivnichny

(57) ABSTRACT

A method, computer program product, and computer system for managing and tracking commands associated with a change on a managed computer system. The managed computer system receives a log-on of an administrator onto the managed computer system, determines the lockdown level of the managed computer system by querying a managing computer system, and retrieves a list of authorized commands under the lockdown level from the managing computer system. The managed computer system determines, by querying the managing computer system, whether an authorized change on the managed computer system exists. The managed computer system removes the lockdown level to receive from the managing computer system authorization of commands that have been locked down, in response to determining that the authorized change exists. The managed computer system sets the lockdown level with the authorized commands on the managed computer system, in response to determining that the authorized change does not exist.

15 Claims, 4 Drawing Sheets

(56) References Cited

U.S. PATENT DOCUMENTS

| | | | | |
|---|---|---|---|---|
| 5,838,918 A * | 11/1998 | Prager | H04L 41/0233 | 709/221 |
| 6,157,953 A * | 12/2000 | Chang | H04L 29/06 | 709/225 |
| 7,356,601 B1 * | 4/2008 | Clymer | H04L 63/0272 | 709/223 |
| 2001/0056494 A1 * | 12/2001 | Trabelsi | G06F 9/468 | 709/229 |
| 2005/0080646 A1 * | 4/2005 | Garland | G06Q 10/06 | 705/7.26 |
| 2006/0004875 A1 * | 1/2006 | Baron | G06Q 10/06 | |
| 2006/0080656 A1 * | 4/2006 | Cain | G06F 8/65 | 717/174 |
| 2008/0196107 A1 * | 8/2008 | Yip | H04L 41/0813 | 726/27 |
| 2008/0215713 A1 * | 9/2008 | Cannon | H04L 12/24 | 709/221 |
| 2009/0217371 A1 * | 8/2009 | Desai | G06F 9/468 | 726/17 |
| 2011/0289547 A1 * | 11/2011 | Aggarwal | H04L 63/20 | 726/1 |

\* cited by examiner

MANAGING AND TRACKING COMMANDS ASSOCIATED WITH A CHANGE ON A COMPUTER SYSTEM

FIELD OF THE INVENTION

The present invention relates generally to computer service management technologies and tools, and more particularly to a system and method of managing and tracking commands associated with a change on a computer system.

BACKGROUND

In computer service management, there is a demand for accurately managing and tracking changes that occur to computer systems. A great amount of system outages are due to changes in the computing environment, where the changes are not planned, authorized, or mistakenly implemented. Since the computer systems are largely managed by processes, there is always the possibility of human errors causing system outages.

All currently known solutions to the computer service management are related to processes and access restrictions. For example, if a process states that a change authorization or work record is required before system properties are adjusted, it is the administrator's responsibility to ensure the change authorization or work record exists. In another example, any user other than a super user has restricted access to a computer system; in this case, it is the super user's responsibility to ensure the process is fulfilled.

SUMMARY

Embodiments of the present invention provide a method, computer program product, and computer system for managing and tracking computer commands associated with a change on a managed computer system. The method, computer program product, and computer system are based on a lockdown level of the managed computer system. The managed computer system receives a log-on of an administrator onto the managed computer system, determines the lockdown level of the managed computer system by querying a managing computer system, and retrieves from the managing computer system a list of authorized commands under the lockdown level. The managed computer system determines whether an authorized change on the managed computer system exists, by querying the managing computer system. In response to determining that the authorized change on the managed computer system exists, the managed computer system removes the lockdown level to receive from the managing computer system authorization of commands that have been locked down. In response to determining that the authorized change on the managed computer system does not exist, the managed computer system sets the lockdown level with the authorized commands on the managed computer system.

DETAILED DESCRIPTION

Figure 1:
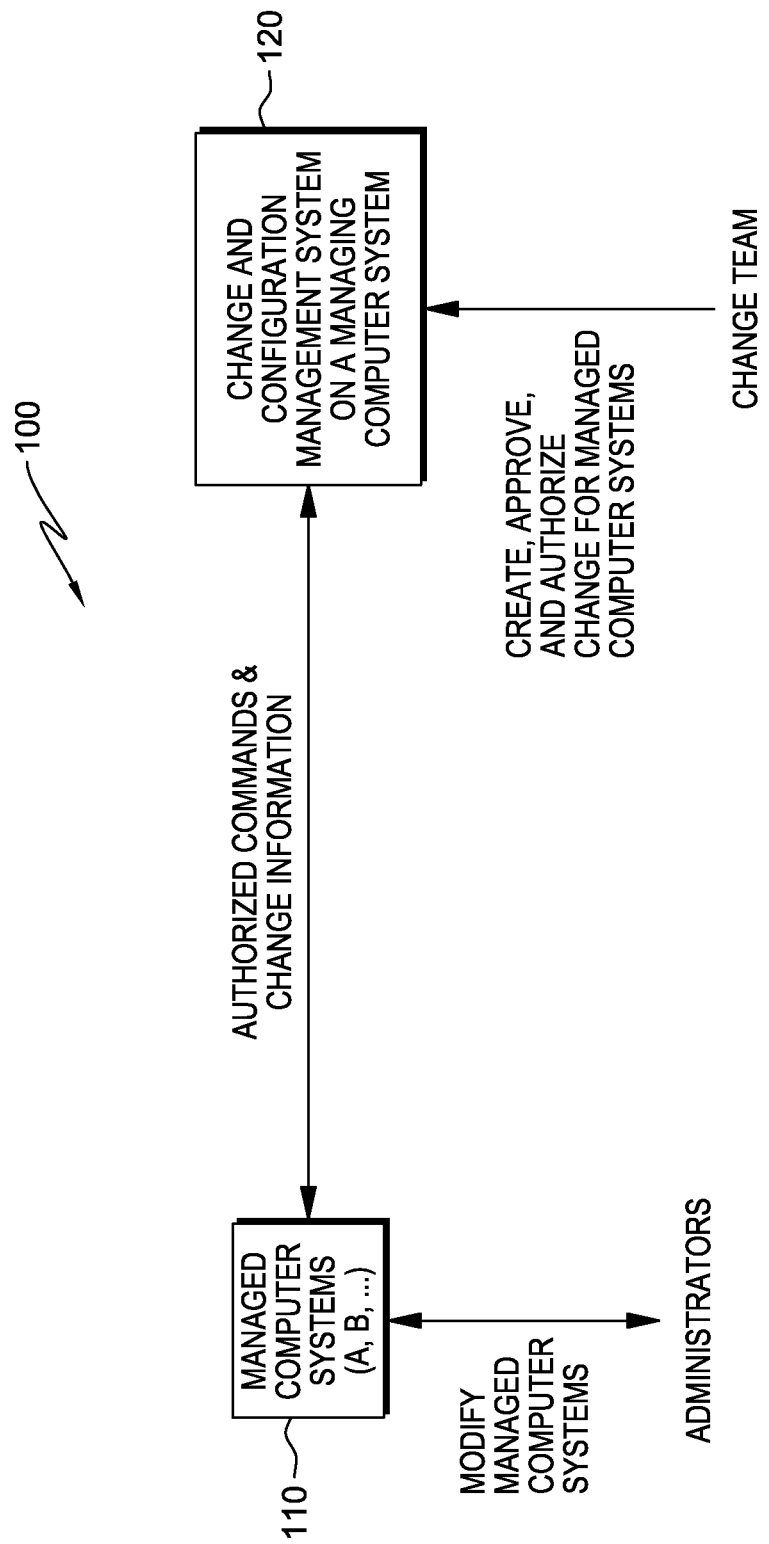
FIG. 1 is a diagram illustrating a service management system for managing and tracking computer commands associated with changes on managed computer systems, in accordance with an exemplary embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a diagram illustrating service management system 100 for managing and tracking computer commands associated with changes on managed computer systems 110, in accordance with an exemplary embodiment of the present invention. In this exemplary embodiment, service management system 100 comprises one or more managed computer systems 110 (i.e. managed computer systems A, B, and so on) and change and configuration management system 120 on at least one managing computer system. Changes on managed computer systems 110 are managed by a change team through change and configuration management system 120. On change and configuration management system 120, the change team manages records of the changes. The records of changes include information about which configuration items (CIs) on managed computer systems 110 are to be changed. The change team creates, approves, and authorizes the changes on change and configuration management system 120. Administrators can only access managed computer systems 110. Upon the creation, approval, and authorization of the changes, the administrators modify managed computer systems 110. On change and configuration management system 120, service management system 100 documents the changes which are conducted on managed computer systems 110.

In service management system 100, managed computer systems 110 are at several lockdown levels. A specific one of managed computer systems 110 may be at a lockdown level. At this lockdown level, only certain non-disruptive commands are authorized to be issued by an administrator of the specific one of managed computer systems 110, unless the specific one of managed computer systems 110 has currently an active change record. The active change record exists for the specific one of managed computer systems 110, if a planned change of a configuration item on the specific one of managed computer systems 110 exists. The planned change has been created, approved, and authorized on change and configuration management system 120 by the change team. Thus, service management system 100 ensures no damaging or disruptive commands can be issued against managed computer systems 110 unless work requests for the changes have been generated, approved, and authorized.

In response to receiving a log-on of the administrator, the specific one of managed computer systems 110 queries change and configuration management system 120 to acquire the active change record and a list of authorized commands under the lockdown level. If the active change record for the specific one of managed computer systems 110 exists, the lockdown level is removed and thus certain locked-down commands become available on the specific one of managed computer systems 110. Then, the administrator of the specific one of managed computer systems 110 is able to issue commands associated with the change. The operating system of the specific one of managed computer systems 110 executes the issued commands associated with the change. The change on the specific one of managed computer systems 110 is accomplished by using a method and system based on lockdown levels.

Figure 2:
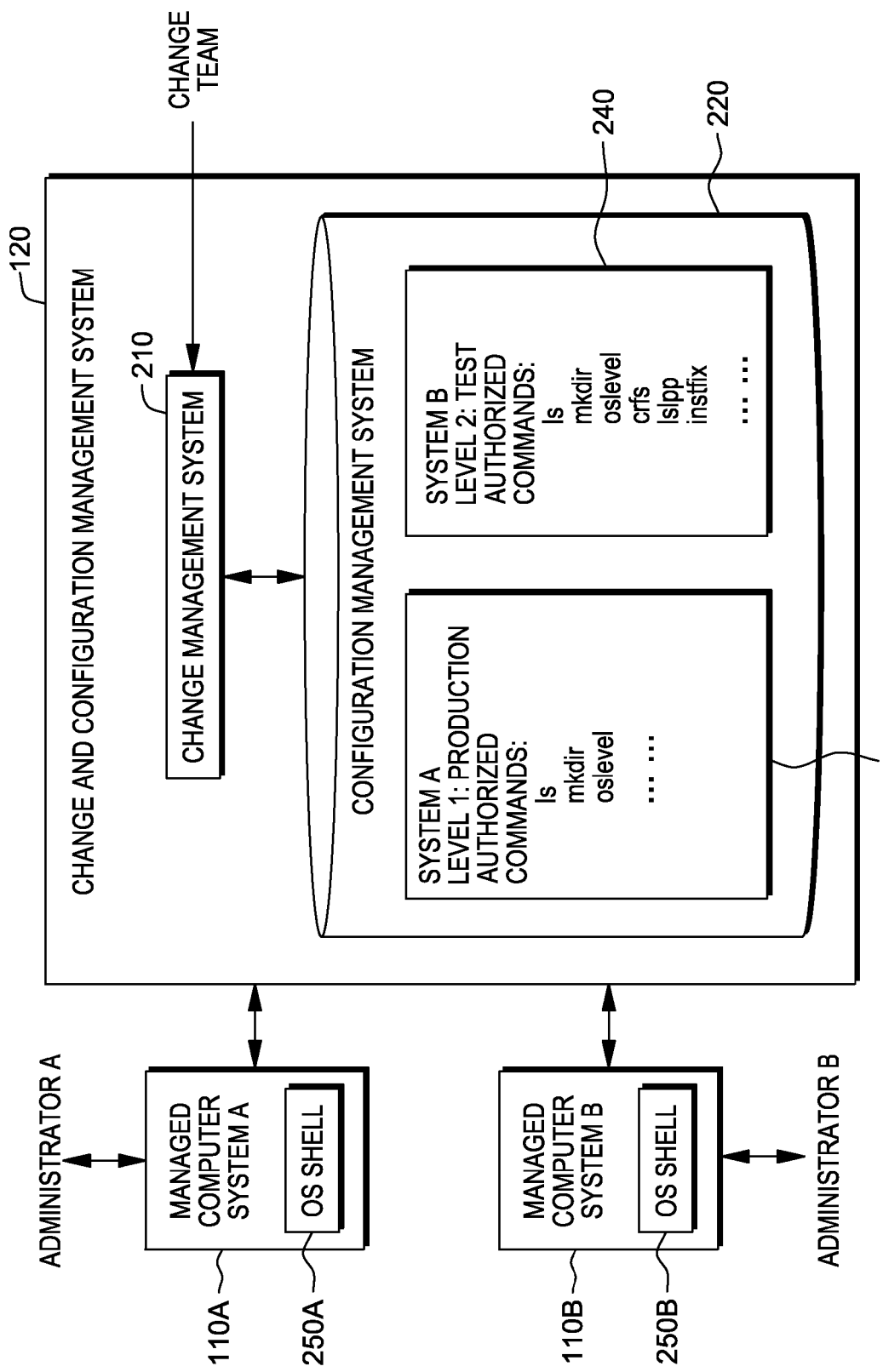
FIG. 2 is a diagram illustrating managed computer systems, a change management system, and a configuration management system, in accordance with an exemplary embodiment of the present invention.

FIG. 2 is a diagram illustrating managed computer system A 110A and managed computer system B 110B, change management system 210, and configuration management system 220, in accordance with an exemplary embodiment of the present invention. Change management system 210 and configuration management system 220 are two primary components of change and configuration management system 120 which has been discussed in previous paragraphs with reference to FIG. 1. Managed computer system A 110A and managed computer system B 110B are two examples of managed computer systems 110 shown in FIG. 1. In the exemplary embodiment, managed computer system A 110A comprises operating system shell (OS shell) 250A, and managed computer system B 110B comprises operating system shell (OS shell) 250B. OS shell 250A provides an interface for administrator A to an operating system of managed computer system A 110A, while OS shell 250B provides an interface for administrator B to an operating system of managed computer system B 110B. OS shells 250A and 250B manage and track commands associated with changes on managed computer system A 110A and managed computer system B 110B, respectively. Respective OS shells 250A and 250B communicate with change and configuration management system 120 to acquire change records and lists of authorized commands from configuration management system 220.

Referring to FIG. 2, configuration management system 220 is a database that stores the change records as well as all configuration information of managed computer system A 110A and managed computer system B 110B. The change records include information about what authorized changes of certain configuration items (CIs) are to be made on managed computer system A 110A and managed computer system B 110B. Data in block 230 show an example of system data of managed computer system A 110A, which is stored on configuration management system 220. Managed computer system A 110A has a lockdown level of 1 or production, which is under operation of providing services and, therefore, the lockdown level only authorizes non-disruptive commands to administrator A. Data in block 240 show an example of system data of managed computer system B 110B, which is stored on configuration management system 220. Managed computer system B 110B is a user acceptance test machine that mirrors changes on a production machine (such as managed computer system A 110A); therefore, changes can be made on the user acceptance test machine before changes are implemented on the production machine. Managed computer system B 110B has a lockdown level of 2 or test. More commands are authorized at the lockdown level of 2 on managed computer system B 110B than at the lockdown level of 1 on managed computer system A 110A.

A change team creates, approves, and authorizes changes on change management system 210. Upon the creation, approval, and authorization of the changes, the change records are established. Change management system 210 stores the change records on configuration management system 220.

Figure 3:
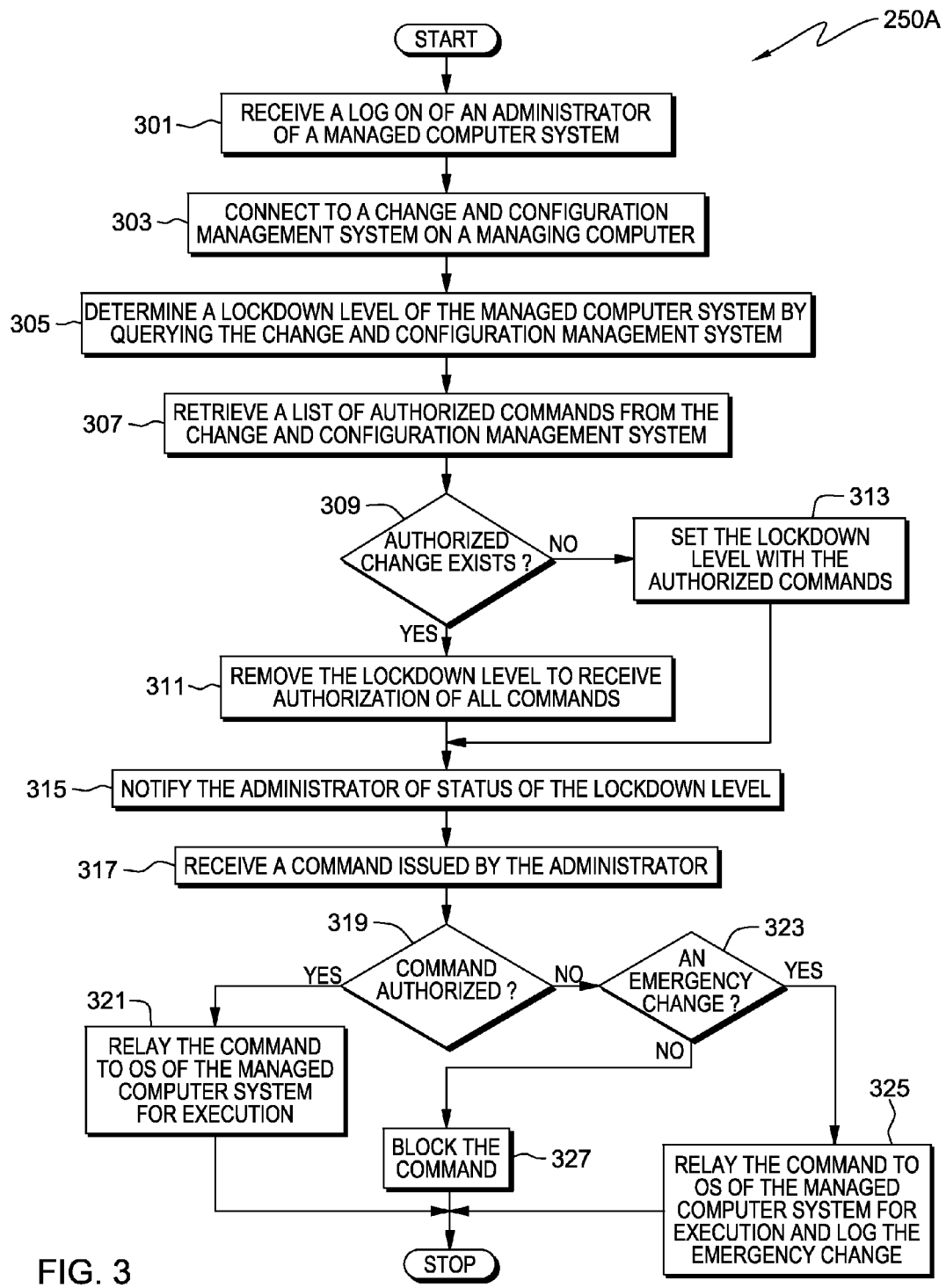
FIG. 3 is a flowchart illustrating operational steps of managing and tracking computer commands associated with a change, in accordance with an exemplary embodiment of the present invention.

FIG. 3 is a flowchart illustrating operational steps of managing and tracking computer commands associated with a change, in accordance with an exemplary embodiment of the present invention. As an example, operational steps of operating system shell 250A on managed computer system A 110A (shown in FIG. 2) are described in the following paragraphs with reference to FIG. 3. In the exemplary embodiment, operating system shell 250A manages and tracks commands associated with a change on managed computer system A 110A, based on a lockdown level of managed computer system A 110A.

Referring to FIG. 3, at step 301, operating system shell 250A receives a log-on of administrator A of managed computer system A 110A. Administrator A logs onto managed computer system A 110A to perform a change. At step 303, operating system shell 250A connects to change and configuration management system 120 on at least one managing computer system, upon the log-on of administrator A.

At step 305, by querying the change and configuration management system 120 on at least one managing computer system, operating system shell 250A determines a lockdown level of managed computer system A 110A. At step 307, operating system shell 250A retrieves, from change and configuration management system 120, a list of authorized commands under the lockdown level. Change and configuration management system 120 on the at least one managing computer system stores system data indicating the lockdown level. In this exemplary embodiment, the lockdown level of managed computer system A 110A is level 1, as shown in block 230 of FIG. 2. Configuration management system 220 also stores, among all system configuration data, authorized commands on managed computer system A 110A under the lockdown level, as shown in block 230 of FIG. 2.

At decision block 309, operating system shell 250A, by querying change and configuration management system 120 on at least one managing computer system, determines whether an authorized change on managed computer system A 110A exists. Change and configuration management system 120 stores a change record which describes which ones of configuration items (CIs) on managed computer system A 110A are to be modified in the change performed by administrator A. If the change record indicates the change on managed computer system A 110A has been created, approved, and authorized, operating system shell 250A determines that the authorized change on managed computer system A 110A exists. Otherwise, operating system shell 250A determines that the authorized change on managed computer system A 110A does not exist.

At step 311 (YES branch of decision block 309), operating system shell 250A removes the lockdown level to receive authorization of all commands, in response to determining that the authorized change on managed computer system A 110A exists. At the lockdown level that has been imposed on managed computer system A 110A, only non-disruptive commands are authorized to be issued by administrator A. Once the lockdown level is removed, commands that have been locked down are authorized for administrator A to perform the change on managed computer system A 110A.

At step 313 (NO branch of decision block 309), in response to determining that the authorized change on managed computer system A 110A does not exist, operating system shell 250A sets the lockdown level with the authorized commands. At this step, the lockdown level is not removed and only the authorized commands included in the list retrieved at step 307 are allowed.

After either step 311 or step 313, operating system shell 250A notifies, at step 315, administrator A of status of the lockdown level on managed computer system A 110A. At step 317, operating system shell 250A receives a command issued by administrator A. At decision block 319, operating system shell 250A determines whether the command issued by administrator A is authorized, by cross-referencing the command issued by administrator A with the authorized commands in the list retrieved at step 307. At step 321 (YES branch of decision block 319), in response to determining that the command issued by administrator A is authorized, operating system shell 250A relays the command issued by administrator A to the operating system of managed computer system A 110A for execution.

In response to determining that the command issued by administrator A is not authorized, operating system shell 250A determines, at decision block 323 (NO branch of decision block 319), whether an emergency change is requested by administrator A. Operating system shell 250A requests administrator A to respond whether emergency change is requested. In response to receiving from administrator A a response that the emergence change is requested, at step 325 (YES branch of decision block 323), operating system shell 250A relays the command issued by administrator A to the operating system of managed computer system A 110A for execution and logs the emergency change. In response to receiving from administrator A a response that the emergence change is not requested, at step 327 (NO branch of decision block 323), operating system shell 250A blocks the command issued by administrator A.

Figure 4:
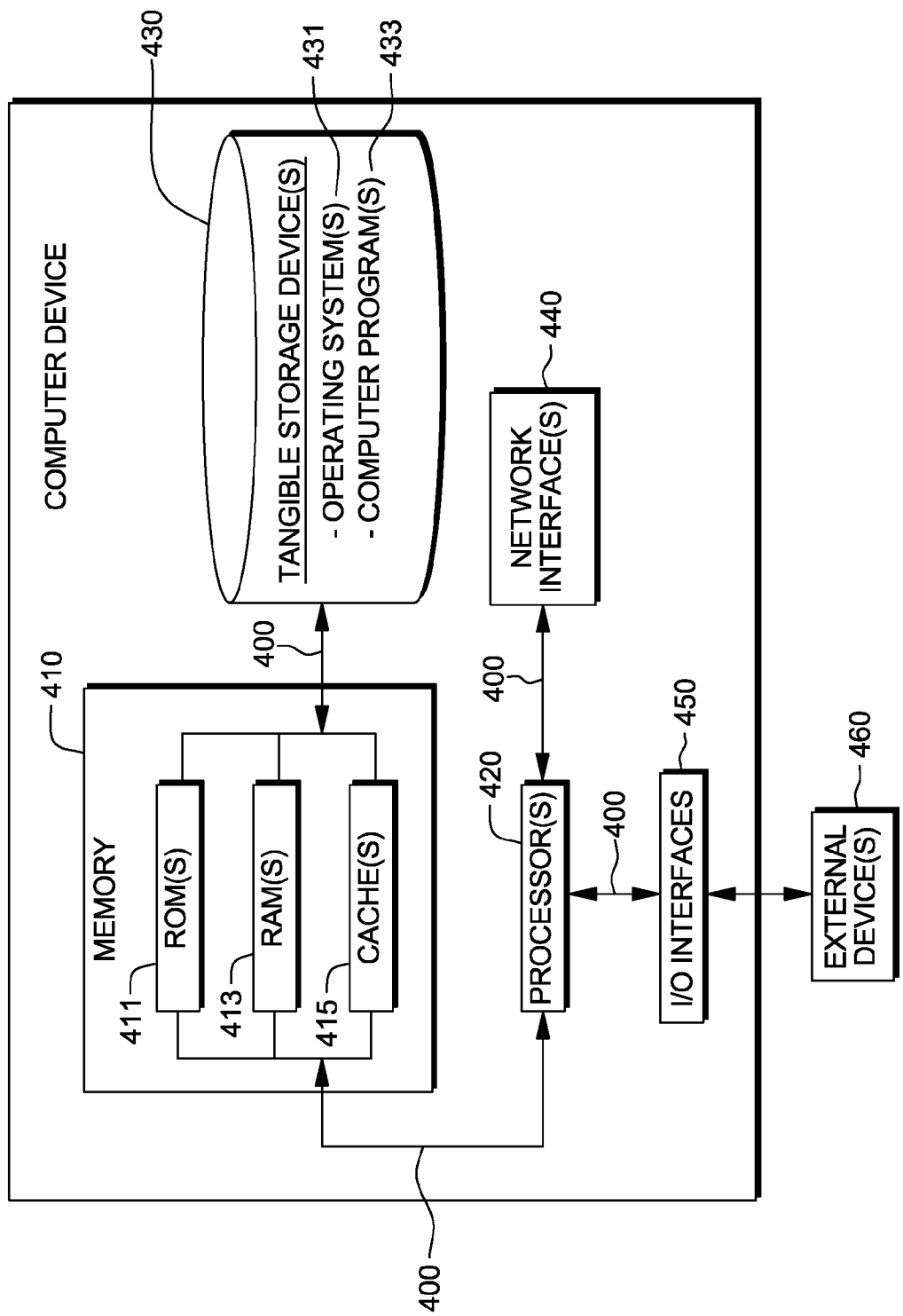
FIG. 4 is a diagram of a computer device hosting a managed computer system or a managing computer system, in accordance with an exemplary embodiment of the present invention.

FIG. 4 is a diagram of a computer device hosting a managed computer system or a managing computer system, in accordance with an exemplary embodiment of the present invention. It should be appreciated that FIG. 4 provides only an illustration of one implementation and does not imply any limitations with regard to the environment in which different embodiments may be implemented.

Referring to FIG. 4, the computer device includes communications fabric 400 which provides communications among processor(s) 420, memory 410, tangible storage device(s) 430, network interface(s) 440, and I/O (input/output) interface(s) 450. Memory 410 includes ROM(s) (Read Only Memory) 411, RAM(s) (Random Access Memory) 413, and cache(s) 415.

One or more operating system(s) 431 and one or more computer program(s) 433 reside on one or more computer-readable tangible storage device(s) 430. For example, on a computer device hosting managed computer system A 110A, one or more computer program(s) 433 include operating system shell 250A (shown in FIG. 2). In the exemplary embodiment, on a computer device hosting the managing computer system, change and configuration management system 120 (including change management system 210 and configuration management system 220, both shown in FIG. 2) resides on one or more computer-readable tangible storage device(s) 430. In other embodiments, change management system 210 and configuration management system 220 may reside on two separate computer devices, respectively.

The computer device further includes I/O interface(s) 450. I/O interface(s) 450 allow for input and output of data with external device(s) 460 that may be connected to the computer device. The computer device further includes network interface(s) 440 for communications between the computer device and a computer network.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing and tracking computer commands associated with a change on a managed computer system, the method implemented by the managed computer system, the method based on a lockdown level of the managed computer system, the method comprising:

receiving, by the managed computer system, a log-on of an administrator onto the managed computer system;

connecting, by the managed computer system, to a change and configuration management system on a managing computer system;

determining, by the managed computer system, by querying the change and configuration management system on the managing computer system, the lockdown level of the managed computer system;

retrieving, by the managed computer system, from the change and configuration management system on the managing computer system, a list of authorized commands associated with a change of one or more configuration items of the managed computer system under the lockdown level;

determining, by the managed computer system, by querying the change and configuration management system on the managing computer system, whether an authorized change on the managed computer system exists;

removing, by the managed computer system, the lockdown level of the managed computer system to receive, from the change and configuration management system on the managing computer system, authorization of commands associated with the change that have been locked down, in response to determining that the authorized change on the managed computer system exists;

setting, by the managed computer system, the lockdown level with the authorized commands associated with the change on the managed computer system, in response to determining that the authorized change on the managed computer system does not exist;

determining, by the managed computer system, whether a command associated with the change issued by the administrator is authorized, in response to receiving the command associated with the change issued by the administrator;

requesting, by the managed computer system, the administrator to respond whether an emergency change is requested, in response to determining that the command associated with the change issued by the administrator is not authorized;

executing, by the managed computer system, the command associated with the change issued by the administrator, in response to receiving from the administrator a response that the emergency change is requested; and recording, by the managed computer system, the emergency change in a log.

2. The method of claim 1, further comprising:

notifying, by the managed computer system, the administrator of status of the lockdown level of the managed computer system;

receiving, by the managed computer system, the command associated with the change issued by the administrator; and executing, by the managed computer system, the command associated with the change issued by the administrator, in response to determining that the command associated with the change issued by the administrator is authorized.

3. The method of claim 1, further comprising:

requesting, by the managed computer system, the administrator to respond whether an emergency change is requested, in response to determining that the command associated with the change issued by the administrator is not authorized; and blocking, by the managed computer system, the command associated with the change issued by the administrator, in response to receiving from the administrator a response that the emergency change is not requested.

4. The method of claim 1, wherein the authorized change on the managed computer system is created, approved, and authorized by a change team through the managing computer system.

5. The method of claim 1, wherein the managing computer system manages one or more managed computer systems.

6. A computer program product for managing and tracking computer commands associated with a change on a managed computer system, the computer program product comprising:

one or more computer-readable tangible storage devices and program instructions stored on at least one of the one or more tangible storage devices, the program instructions comprising:

program instructions to receive, by the managed computer system, a log-on of an administrator onto the managed computer system;

program instructions to connect, by the managed computer system, to a change and configuration management system on a managing computer system;

program instructions to determine, by the managed computer system, by querying the change and configuration management system on the managing computer system, a lockdown level of the managed computer system;

program instructions to retrieve, by the managed computer system, from the change and configuration management system on the managing computer system, a list of authorized commands associated with a change of one or more configuration items of the managed computer system under the lockdown level;

program instructions to determine, by the managed computer system, by querying the change and configuration management system on the managing computer system, whether an authorized change on the managed computer system exists;

program instructions to remove, by the managed computer system, the lockdown level of the managed computer system to receive from the change and configuration management system on the managing computer system authorization of commands associated with the change that have been locked down, in response to determining that the authorized change on the managed computer system exists;

program instructions to set, by the managed computer system, the lockdown level with the authorized commands associated with the change on the managed computer system, in response to determining that the authorized change on the managed computer system does not exist;

program instructions to determine, by the managed computer system, whether a command associated with the change issued by the administrator is authorized, in response to receiving the command associated with the change issued by the administrator;

program instructions to request, by the managed computer system, the administrator to respond whether an emergency change is requested, in response to determining that the command associated with the change issued by the administrator is not authorized;

program instructions to execute, by the managed computer system, the command associated with the change issued by the administrator, in response to receiving from the administrator a response that the emergency change is requested; and program instructions to record, by the managed computer system, the emergency change in a log.

7. The computer program product of claim 6, further comprising:

program instructions to notify, by the managed computer system, the administrator of status of the lockdown level of the managed computer system;

program instructions to receive, by the managed computer system, the command associated with the change issued by the administrator; and program instructions to execute, by the managed computer system, the command associated with the change issued by the administrator, in response to determining that the command associated with the change issued by the administrator is authorized.

8. The computer program product of claim 6, further comprising:

program instructions to request, by the managed computer system, the administrator to respond whether an emergency change is requested, in response to determining that the command associated with the change issued by the administrator is not authorized; and program instructions to block, by the managed computer system, the command associated with the change issued by the administrator, in response to receiving from the administrator a response that the emergency change is not requested.

9. The computer program product of claim 6, wherein the authorized change on the managed computer system is created, approved, and authorized by a change team through the managing computer system.

10. The computer program product of claim 6, wherein the managing computer system manages one or more managed computer systems.

11. A computer system for managing and tracking computer commands associated with a change on a managed computer system, the computer system comprising:

one or more processors, one or more computer-readable tangible storage devices, and program instructions stored on at least one of the one or more storage devices for execution by at least one of the one or more processors, the program instructions comprising:

program instructions to receive, by the managed computer system, a log-on of an administrator onto the managed computer system;

program instructions to connect, by the managed computer system, to a change and configuration management system on a managing computer system;

program instructions to determine, by the managed computer system, by querying the change and configuration management system on the managing computer system, a lockdown level of the managed computer system;

program instructions to retrieve, by the managed computer system, from the change and configuration management system on the managing computer system, a list of authorized commands associated with a change of one or more configuration items of the managed computer system under the lockdown level;

program instructions to determine, by the managed computer system, by querying the change and configuration management system on the managing computer system, whether an authorized change on the managed computer system exists;

program instructions to remove, by the managed computer system, the lockdown level of the managed computer system to receive from the change and configuration management system on the managing computer system authorization of commands associated with a change that have been locked down, in response to determining that the authorized change on the managed computer system exists;

program instructions to set, by the managed computer system, the lockdown level with the authorized commands associated with a change on the managed computer system, in response to determining that the authorized change on the managed computer system does not exist;

program instructions to determine, by the managed computer system, whether a command associated with the change issued by the administrator is authorized, in response to receiving the command associated with the change issued by the administrator;

program instructions to request, by the managed computer system, the administrator to respond whether an emergency change is requested, in response to determining that the command associated with the change issued by the administrator is not authorized;

program instructions to execute, by the managed computer system, the command associated with the change issued by the administrator, in response to receiving from the administrator a response that the emergency change is requested; and program instructions to record, by the managed computer system, the emergency change in a log.

12. The computer system of claim 11, further comprising:
program instructions to notify, by the managed computer system, the administrator of status of the lockdown level of the managed computer system;
program instructions to receive, by the managed computer system, the command associated with the change issued by the administrator; and
program instructions to execute, by the managed computer system, the command associated with the change issued by the administrator, in response to determining that the command associated with the change issued by the administrator is authorized.

13. The computer system of claim 11, further comprising:
program instructions to request, by the managed computer system, the administrator to respond whether an emergency change is requested, in response to determining that the command associated with the change issued by the administrator is not authorized; and
program instructions to block, by the managed computer system, the command associated with the change issued by the administrator, in response to receiving from the administrator a response that the emergency change is not requested.

14. The computer system of claim 11, wherein the authorized change on the managed computer system is created, approved, and authorized by a change team through the managing computer system.

15. The computer system of claim 11, wherein the managing computer system manages one or more managed computer systems.

* * * * *